(12) United States Patent
Iida et al.

(10) Patent No.: US 9,581,747 B2
(45) Date of Patent: Feb. 28, 2017

(54) METHOD FOR PRODUCING OPTICAL FILM, OPTICAL FILM, LAMINATED POLARIZING PLATE, AND IMAGE DISPLAY

(75) Inventors: Toshiyuki Iida, Ibaraki (JP); Motoko Kawasaki, Ibaraki (JP); Nao Murakami, Ibaraki (JP); Hiroyuki Yoshimi, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 176 days.

(21) Appl. No.: 13/376,515

(22) PCT Filed: Jun. 18, 2010

(86) PCT No.: PCT/JP2010/060344
§ 371 (c)(1),
(2), (4) Date: Dec. 6, 2011

(87) PCT Pub. No.: WO2010/147204
PCT Pub. Date: Dec. 23, 2010

(65) Prior Publication Data
US 2012/0081785 A1 Apr. 5, 2012

(30) Foreign Application Priority Data

Jun. 19, 2009 (JP) ................................. 2009-146327
Mar. 29, 2010 (JP) ................................. 2010-076118

(51) Int. Cl.
*G02B 5/30* (2006.01)
*C08L 81/06* (2006.01)

(52) U.S. Cl.
CPC ............ *G02B 5/3083* (2013.01); *C08L 81/06* (2013.01)

(58) Field of Classification Search
None
See application file for complete search history.

(56) References Cited

U.S. PATENT DOCUMENTS 5,245,456 A  9/1993 Yoshimi et al.
5,580,950 A * 12/1996 Harris et al. ............. 528/350
(Continued)

FOREIGN PATENT DOCUMENTS

CN   1758106 A   4/2006
CN   1774654 A   5/2006
(Continued)

OTHER PUBLICATIONS

Korean Office Action dated May 3, 2013, issued in corresponding application No. 10-2012-7000988, with partial translation.
(Continued)

*Primary Examiner* — Stephone B Allen
*Assistant Examiner* — James McGee
(74) *Attorney, Agent, or Firm* — Westerman, Hattori, Daniels & Adrian, LLP

(57) ABSTRACT

A method for producing an optical film including a birefringence layer having a refractive index distribution that satisfies nx>nz>ny, by which productivity of an optical film becomes high because there are a few steps, and a contamination is reduced, is provided. The method for producing an optical film including a birefringence layer includes forming an applied film by applying a birefringence layer forming material containing a non-liquid crystalline material with a birefringence (Δnxz) in the thickness direction thereof of 0.0007 or more directly on a shrinkable film, and forming a birefringence layer having a refractive index distribution that satisfies nx>nz>ny by shrinking the applied film through shrinking the shrinkable film.

9 Claims, 2 Drawing Sheets

(56) References Cited

U.S. PATENT DOCUMENTS

| | | | |
|---|---|---|---|
| 7,215,839 B2* | 5/2007 | Kawahara | G02B 5/3083 349/117 |
| 7,223,452 B2 | 5/2007 | Murakami et al. | |
| 2006/0028601 A1 | 2/2006 | Kawahara et al. | |
| 2006/0055853 A1 | 3/2006 | Murakami et al. | |
| 2006/0072057 A1 | 4/2006 | Yano et al. | |
| 2006/0078693 A1 | 4/2006 | Ishibashi et al. | |
| 2006/0182896 A1 | 8/2006 | Murakami et al. | |
| 2006/0257078 A1 | 11/2006 | Kawahara et al. | |
| 2006/0275559 A1 | 12/2006 | Ishibashi et al. | |
| 2007/0177087 A1 | 8/2007 | Kawahara et al. | |
| 2008/0123189 A1* | 5/2008 | Ikeda et al. | 359/485 |
| 2010/0188749 A1 | 7/2010 | Hirayama et al. | |

FOREIGN PATENT DOCUMENTS

| | | |
|---|---|---|
| EP | 0 482 620 B1 | 3/1997 |
| JP | 5-157911 A | 6/1993 |
| JP | 05-313014 A | 11/1993 |
| JP | 2000-9930 A | 1/2000 |
| JP | 2001-249225 A | 9/2001 |
| JP | 2003-075824 A | 3/2003 |
| JP | 2004-78203 A | 3/2004 |
| JP | 2005-258459 A | 9/2005 |
| JP | 2005-339595 A | 12/2005 |
| JP | 2006-133720 A | 5/2006 |
| JP | 2006-195350 A | 7/2006 |
| JP | 2006-274135 A | 10/2006 |
| JP | 2008-171007 A | 7/2008 |
| JP | 2008-281667 A | 11/2008 |
| JP | 2009-086604 A | 4/2009 |
| KR | 10-2006-0050240 A | 5/2006 |
| KR | 10-2007-0015634 A | 2/2007 |
| TW | 200428110 A | 4/1993 |
| TW | 200619698 A | 9/1994 |
| WO | 2005/059609 A1 | 6/2005 |
| WO | WO 2009034823 A1 * | 3/2009 |

OTHER PUBLICATIONS

International Search Report of PCT/JP2010/060344, mailing date Jul. 27, 2010.
Office Action (Notification of Reason(s) for Rejection) of the corresponding Japanese Application No. 2010-139102 dated Feb. 22, 2011 w/ partial English translation.
U.S. Office Action dated Dec. 27, 2013, issued in U.S. Appl. No. 12/813,592.
Chinese Office Action dated Jun. 23, 2011, issued in Chinese Patent Application No. 2010-102085877, w/ English translation.
Korean Office Action dated Oct. 24, 2011, issued in Korean Patent Application No. 10-2010-0057665, w/ English translation.
Chinese Office Action dated May 3, 2012, issued in Chinese Patent Application No. 201010208587.7, w/ English translation.
Decision of Rejection dated Jun. 27, 2012, issued in Korean Patent Application No. 10-2010-0057665, w/ Partial English translation.
Trial Decision dated Mar. 21, 2013, issued in Korean Patent Application No. 10-2010-0057665, w/ Partial English translation.
Taiwanese Office Action dated May 24, 2013, issued in Taiwanese Patent Application No. 099119913 w/ partial English translation.
Japanese Office Action dated Oct. 2, 2013, issued in Japanese Patent Application No. 2010-139098, w/ partial English translation.
US Office Action dated Mar. 25, 2013, issued in U.S. Appl. No. 12/813,592.
US Office Action dated Sep. 9, 2013, issued in U.S. Appl. No. 12/813,592.
U. S. Office Action dated Jun. 12, 2014, issued in U.S. Appl. No. 12/813,592 (14 pages).
Communication pursuant to Rule 114(2) EPC, Third Party Submission against the corresponding European patent application No. 10789577.3, dated Feb. 26, 2015. (28 pages).
Extended European Search Report dated Jul. 14, 2015, issued in counterpart European Patent Application No. 10789577.3 (7 pages).
Yamaguchi et al, "Extraordinary Wavelength Dispersion of Orientation Birefringence for Cellulose Esters", Macromolecules, pp. 9034-9040, vol. 42, Sep. 30, 2009; cited in Extended European Search Report dated Jul. 14, 2015.

* cited by examiner

METHOD FOR PRODUCING OPTICAL FILM, OPTICAL FILM, LAMINATED POLARIZING PLATE, AND IMAGE DISPLAY

TECHNICAL FIELD

The present invention relates to a method for producing an optical film, the optical film, a laminated polarizing plate, and an image display.

BACKGROUND ART

For various screen displays of mobile phones, personal computers, liquid crystal televisions, and the like, high-contrast liquid crystal displays (LCDs) utilizing birefringence are used. In recent years, definition of LCDs has been increased, and the LCDs are variously used. Accompanying the increase and the various uses, the LCDs are required to improve display qualities such as widening a viewing angle and the like. To widen a viewing angle, an optical film having a refractive index distribution that satisfies nx>nz>ny is used, for example. As the method for producing the optical film, proposed is a method in which a laminate is formed by attaching a shrinkable film to one surface or each of the surfaces of a resin film via an acrylic pressure-sensitive adhesive or the like, and the laminate is subjected to a heat-stretching treatment while a shrinkage force is applied to the laminate in the direction that is orthogonal to the direction in which the laminate is stretched (Patent Document 1).

PRIOR ART DOCUMENTS

Patent Document

Patent Document 1: JP H5-157911 A

SUMMARY OF INVENTION

Problem to be Solved by the Invention

However, in the above-described producing method, it is required to conduct many steps of producing a resin film, applying a pressure-sensitive adhesive to a shrinkable film, attaching the resin film to the shrinkable film, stretching and shrinking, and removing the shrinkable film, whereby productivity of the optical film is low. In the attaching step of the above-described producing method, an attachment failure and a contamination occur, whereby the productivity is further reduced. In the removing step of the above-mentioned producing method, an adherent remains, whereby the productivity is yet further reduced. Further, in the above-described producing method, a failure in alignment property due to a failure in sticking characteristic such as, for example, ununiformity of adhesion and the removal occurs, whereby a quality of the optical film is reduced.

The present invention is intended to provide a method for producing an optical film including a birefringence layer having a refractive index distribution that satisfies nx>nz>ny, by which the productivity becomes high because there are few steps, and contamination is reduced.

Means for Solving Problem

In order to achieve the aforementioned object, the optical film producing method of the present invention is a method for producing an optical film including a birefringence layer. The method includes forming a film (hereinafter referred to as "applied film") by applying a birefringence layer forming material containing a non-liquid crystalline material with a birefringence ($\Delta nxz$) in a thickness direction thereof, represented by the following formula, of 0.0007 or more directly on a shrinkable film; and forming a birefringence layer having a refractive index distribution that satisfies nx>nz>ny by shrinking the applied film through shrinking the shrinkable film, $\Delta nxz = nx' - nz'$ nx': in a case where the non-liquid crystalline material is solidified so as to be a solidified layer, a refractive index in a direction (a slow axis direction) in which an in-plane refractive index of the solidified layer reaches its maximum, nz': a refractive index in a thickness direction of the solidified layer that is orthogonal to each of an nx' direction and a direction (a fast axis direction) that is orthogonal to the nx' direction within a plane of the solidified layer, nx: a refractive index in a direction (a slow axis direction) in which an in-plane refractive index of the birefringence layer reaches its maximum, ny: a refractive index in a direction (a fast axis direction) that is orthogonal to an nx direction within a plane of the birefringence layer, and nz: a refractive index in a thickness direction of the birefringence layer that is orthogonal to each of the nx direction and an ny direction.

Effects of the Invention

In the producing method of the present invention, a birefringence layer forming material is applied directly on a shrinkable film without the intervention of a pressure-sensitive adhesive or the like. Thus, according to the present invention, there is no need to conduct the step of attaching a resin film to a shrinkable film as in the conventional producing method, whereby productivity of an optical film is increased. According to the present invention, there is no need to conduct the attaching step, whereby an attachment failure and a contamination are reduced. Thus, the productivity is further increased. According to the present invention, a failure in alignment property due to a failure in sticking characteristic does not occur. Thus, a high-quality optical film can be provided. According to the present invention, a birefringence layer has high capability of generating birefringence, whereby it can be thin. There is a spillover effect that an optical film can be thinner because a birefringence layer forming material is applied directly on a shrinkable film without the intervention of a pressure-sensitive adhesive or the like. According to the present invention, there is a spillover effect that an optical film with high alignment axis accuracy can be obtained because there are few steps and contamination is reduced.

DESCRIPTION OF EMBODIMENTS

Figure 1:
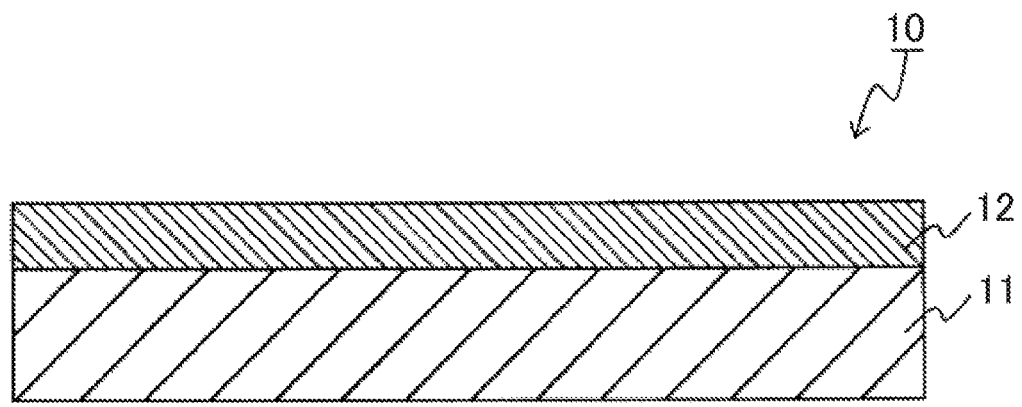
FIG. 1 is a cross-sectional view showing an example of a configuration of the optical film of the present invention.

The solidified layer in the definition of the birefringence ($\Delta nxz$) means a layer formed by solidifying an applied film that is formed by applying a solution obtained by dissolving the non-liquid crystalline material in a solvent directly on a base without stretching and shrinking, and the thickness thereof is not at all limited. The birefringence (Δnxz) is 0.0007 or more, preferably in the range from 0.0007 to 0.05, more preferably from 0.001 to 0.04.

In the producing method of the present invention, the non-liquid crystalline material preferably is at least one material selected from the group consisting of polyarylate, polyamide, polyimide, polyester, polyaryletherketone, polyetherketone, polyamideimide, polyesterimide, polyvinyl alcohol, polyfumaric acid ester, polyether sulfone, and polysulfone.

In the producing method of the present invention, the polyarylate preferably includes repeating units represented by the following general formula (I).

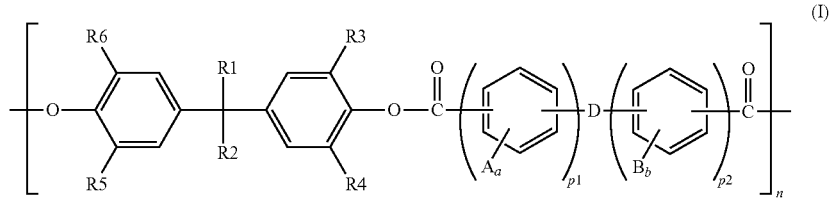

In the formula (I), A and B each represents a substituent, are each a halogen atom, an alkyl group with the number of carbon atoms from 1 to 6, or a substituted or unsubstituted aryl group, and are identical to or different from each other, a and b represent the numbers of substituents of A and B, respectively, and are each an integer from 1 to 4, D is a covalent bond, a $CH_2$ group, a $C(CH_3)_2$ group, a $C(CZ_3)_2$ group (where Zs are halogen atoms), a CO group, an O atom, a S atom, a $SO_2$ group, a $Si(CH_2CH_3)_2$ group, or a $N(CH_3)$ group, R1 is a straight chain or branched alkyl group with the number of carbon atoms from 1 to 10 or a substituted or unsubstituted aryl group, R2 is a straight chain or branched alkyl group with the number of carbon atoms from 2 to 10 or a substituted or unsubstituted aryl group, R3, R4, R5, and R6 are each a hydrogen atom or a straight chain or branched alkyl group with the number of carbon atoms from 1 to 4, are identical to or different from each other, and are not all hydrogen atoms, p1 is an integer from 0 to 3, p2 is an integer from 1 to 3, and n is an integer of 2 or more.

In the forming of the birefringence layer of the producing method of the present invention, a shrinkage ratio is preferably in the range from 0.50 to 0.99, more preferably from 0.60 to 0.9, yet more preferably from 0.75 to 0.95

In the forming of the birefringence layer of the producing method of the present invention, the applied film may be shrunk through shrinking the shrinkable film, and a laminate of the shrinkable film and the applied film is stretched in a direction that is orthogonal to the direction (hereinafter referred to as "shrinking direction") in which the shrinkage film is shrunk. In this case, a stretch ratio of the laminate is preferably in the range from 1.01 to 3.0, more preferably from 1.05 to 2.0, and yet more preferably from 1.10 to 1.50.

In the present invention, "orthogonal" includes a case of substantially orthogonal. The substantially orthogonal is, for example, in the range from 90°±2° and preferably from 90°±1°.

In the producing method of the present invention, the shrinkable film preferably is a stretchable film formed of at least one forming material selected from the group consisting of polyolefin, polyester, an acrylic resin, polyamide, polycarbonate, a norbornene resin, polystyrene, polyvinyl chloride, polyvinylidene chloride, a cellulose resin, polyether sulfone, polysulfone, polyimide, polyacryl, an acetate resin, polyarylate, polyvinyl alcohol, and a liquid crystal polymer.

In the forming of the birefringence layer of the producing method of the present invention, it is preferred that the shrinkable film is shrunk by heating the shrinkable film.

In the producing method of the present invention, the thickness of the birefringence layer is preferably 20 μm or less. The thickness is more preferably in the range from 1 to 20 μm, yet more preferably from 3 to 15 μm.

The optical film of the present invention is an optical film including: a birefringence layer including repeating units represented by the following general formula (I), wherein the birefringence layer has an in-plane retardation in the range from 100 to 500 nm.

In the optical film of the preset invention, a in-plane retardation of the birefringence layer is preferably in the range from 100 to 300 nm, more preferably from 130 to 290 nm. The in-plane retardation is determined based on (nx−ny)×d, assuming that a refractive index in a direction (a slow axis direction) in which an in-plane refractive index of the birefringence layer reaches its maximum is nx, a refractive index in a direction (a fast axis direction) that is orthogonal to the nx direction within a plane of the birefringence layer is ny, and the thickness of the birefringence layer is d (nm).

The laminated polarizing plate of the present invention is a laminated polarizing plate including: a polarizing plate; and the optical film of the present invention, wherein an absorption axis of the polarizing plate is orthogonal to or parallel with a slow axis of the optical film.

The image display of the present invention is an image display including the laminated polarizing plate of the present invention.

Next, the present invention is described in detail. Note here that the present invention is not limited by the following description.

The optical film of the present invention is produced by forming an applied film by applying a birefringence layer forming material directly on a shrinkable film and shrinking the applied film through shrinking the shrinkable film.

The shrinkable film forming material is not particularly limited, and is preferably a thermoplastic resin because it is suitable for a shrinking treatment described below. Specific examples thereof include polyolefin resins such as polyethylene and polypropylene (PP), a polyester resin such as polyethylene terephthalate (PET), an acrylic resin, polyamide, polycarbonate, a norbornene resin, polystyrene, polyvinyl chloride, polyvinylidene chloride, a cellulose resin such as triacetylcellulose, polyether sulfone, polysulfone, polyimide, polyacryl, an acetate resin, polyarylate, polyvinyl alcohol, and mixtures thereof. A liquid crystal polymer or the like also can be used. The shrinkable film preferably is a uniaxial-stretched or biaxial-stretched film formed of one or two types of the shrinkable film forming materials. As the shrinkable film, a commercially available shrinkable film may be used, for example. Examples of the commercially available shrinkable film include "SPACE-CLEAN" manufactured by TOYOBO CO., LTD., "FANCY WRAP" manufactured by GUNZE Limited, "TORAYFUN" and "LUMIRROR" manufactured by TORAY INDUSTRIES, INC., "ARTON" manufactured by JSR Corporation, "ZEONOR" manufactured by ZEON CORPORATION, and "SUNTEC" manufactured by Asahi Kasei Corporation.

The thickness of the shrinkable film is not particularly limited, and is, for example, in the range from 10 to 300 μm, preferably from 20 to 200 μm, more preferably from 40 to 150 μm. The surface of the shrinkable film may be subjected to a surface treatment for the sake of improving adhesiveness with the birefringence layer and the like. Examples of the surface treatment include chemical or physical treatments such as a chromic acid treatment, exposure to ozone, exposure to flame, exposure to high voltage electric shock, and an ionizing radiation treatment. A primer layer may be formed on the surface of the shrinkable film by applying a primer (for example, a sticky material).

The birefringence layer forming material contains a non-liquid crystalline material with the birefringence (Δnxz) of 0.0007 or more.

Examples of the non-liquid crystalline material include polyarylate, polyamide, polyimide, polyester, polyaryletherketone, polyetherketone, polyamideimide, polyesterimide, polyvinyl alcohol, polyfumaric acid ester, polyether sulfone, poly sulfone, and mixtures thereof.

As mentioned above, the polyarylate preferably includes repeating units represented by the formula (I).

In the formula (I), examples of the unsubstituted aryl group include a phenyl group, a biphenyl group, a terphenyl group, a naphthyl group, a binaphthyl group, and a triphenylphenyl group. Examples of the substituted aryl group include those in which at least one of hydrogen atoms in the unsubstituted aryl group is substituted for a straight chain or branched alkyl group with the number of carbon atoms from 1 to 10, a straight chain or branched alkoxy group with the number of carbon atoms from 1 to 10, a nitro group, an amino group, a silyl group, a halogen atom, a halogenated alkyl group, or a phenyl group. Examples of the halogen atom include fluorine, chlorine, bromine, and iodine.

In the formula (I), it is preferred that R1 is a methyl group and R2 is a straight chain or branched alkyl group with the number of carbon atoms from 2 to 4, and it is particularly preferred that R2 is an ethyl group or an isobutyl group. With this configuration, the polyarylate has a high capability of generating birefringence and is superior in heat resistance (the glass-transition temperature is high), as well as being superior in solubility to low-polar solvents such as toluene and xylene.

In the formula (I), it is preferred that at least one of R3, R4, R5, and R6 is a straight chain or branched alkyl group with the number of carbon atoms from 1 to 4, it is more preferred that all of R3, R4, R5, and R6 are straight chain or branched alkyl groups with the number of carbon atoms from 1 to 4, and it is particularly preferred that all of R3, R4, R5, and R6 are methyl groups. In this case, R2 may be a methyl group.

In the present invention, the polyarylate is preferably non-halogenated polyarylate having no halogen atom in the chemical structure thereof in terms of reducing environmental loads. With the above-mentioned specific combination of R1 to R6, the polyarylate has high solubility to solvents even though it does not contain a halogen atom in the chemical structure thereof, as mentioned above.

The polyarylate may be a copolymer having two or more types of monomer units each represented by the formula (I) in which the monomer units differ in any of A, B, D, R1 to R6, p1, p2, and n.

In order to have both of solubility to solvents and a capability of generating birefringence, it is preferred that D is a covalent bond, p1=0, and p2=1 in the formula (I), i,e., the polyarylate has the structure represented by the following general formula (II). It is more preferred that the polyarylate has a structure represented by the following general formula (III), in which a derivative of terephthalic acid is used as an acid component or a structure of copolymer represented by the following general formula (IV), in which a derivative of terephthalic acid and that of isophthalic acid are used. Specifically, in terms of solubility to general-purpose solvents, the polyarylate preferably is a copolymer having a structure represented by the following general formula (IV).

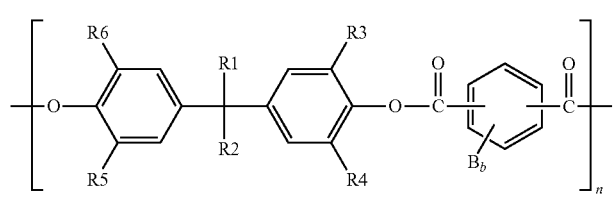

(II)

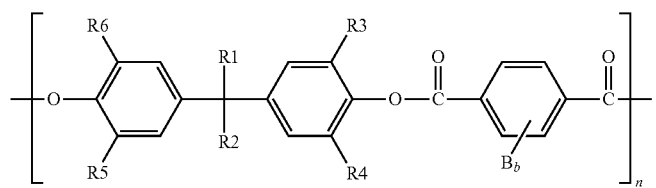

(III)

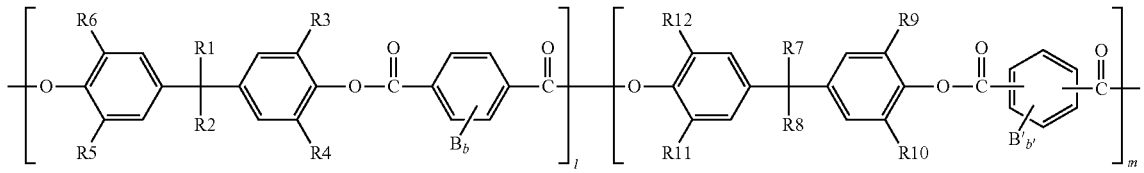

In the formulae (II) to (IV), B, R1 to R6, and b are the same as those in the formula (I), B', R7, R8, R9 to R12, and b' are the same as B, R1, R2, R3 to R6, and b, respectively, and n, l, and m are each an integer of 2 or more. In the formula (IV), the polyarylate is represented as a block copolymer for the sake of convenience, but is not limited to this and may be a random copolymer.

In the polyarylate represented by the formula (IV), the content of a structure derived from the derivative of terephthalic acid among acid components, i.e., l/(l+m), is preferably 0.3 or more. With l/(l+m) in the above-mentioned range, the polyarylate has a high capability of generating birefringence and is superior in heat resistance. l/(l+m) is more preferably 0.5 or more, yet more preferably 0.6 or more.

The content of the structures represented by the formulae (I) to (IV) is not particularly limited, and is, preferably 50% by mol or more, more preferably 75% by mol or more, and yet more preferably 80% by mol or more.

The weight-average molecular weight (Mw) of the polyarylate is preferably in the range from 3,000 to 1,000,000 as a value measured by a gel permeation chromatography method using a tetrahydrofuran as a solvent (using polystyrene as a standard). With Mw in the above-described range, the optical film having a high strength and being suppressed from changing optical characteristics at the high temperature environment, as well as being superior in operability such as solvent solubility can be obtained. Mw is more preferably in the range from 5,000 to 1,000,000, yet more preferably from 10,000 to 500,000, and most preferably from 50,000 to 350,000.

The glass-transition temperature of the polyarylate is not particularly limited, and is, in terms of heat resistance of the polyarylate, preferably 100° C. or more, more preferably 120° C. or more, and yet more preferably 150° C. or more. Further, in terms of formability and processability of the polyarylate, the glass-transition temperature is preferably 300° C. or less, more preferably 250° C. or less.

The method for producing the polyarylate is not particularly limited, and the polyarylate is obtained using known methods. In general, the polyarylate is produced by polycondensation between a bisphenol compound and dicarboxylic acid or a derivative thereof.

Examples of the polycondensation method include a melt polycondensation method by deacetylation; a melt polycondensation method by dephenolization; a dehydrochlorination homogeneous polymerization method in which a bisphenol compound is reacted with dicarboxylic acid chloride in an organic solvent system in the presence of an organic base; an interfacial polycondensation method in which a bisphenol compound is reacted with dicarboxylic acid chloride in two-phase system of alkali aqueous solution and a water-immiscible organic solvent; and a direct polycondensation method in which an active intermediate is generated in a reaction system using a bisphenol compound and dicarboxylic acid with a condensation agent. Among them, the interfacial polycondensation method is preferred in terms of improvements in transparency and heat resistance of the polyarylate and an increase in molecular weight of the same.

When the polyarylate is produced by the interfacial polycondensation method, monomers (a bisphenol compound and dicarboxylic acid chloride), an organic solvent, alkali, a catalyst, and the like are used.

Examples of the bisphenol compound include 2,2-bis(4-hydroxyphenyl)butane, 2,2-bis(4-hydroxyphenyl)-4-methyl-pentane, 3,3-bis(4-hydroxyphenyl)pentane, 2,2-bis(4-hydroxyphenyl)hexane, 1,1-bis(4-hydroxyphenyl)-1-phenylmethane, and bis(4-hydroxyphenyl) diphenylmethane.

Examples of the dicarboxylic acid chloride include: unsubstituted aromatic chlorides such as terephthalic acid chloride, isophthalic acid chloride, phthalic acid chloride, and 4-4'-diphenyl dicarboxylic acid chloride; and those in which these unsubstituted aromatic chlorides have substituents and the like shown as examples of A and B in the formula (I).

The organic solvent is not particularly limited, and is preferably the one that has low miscibility with water and dissolves the polyarylate. For example, a halogen solvent such as dichloromethane, chloroform, or 1,2-dichloroethane, an aromatic hydrocarbon solvent such as toluene or xylene, or anisole is preferably used. These solvents may be used by mixing two or more types thereof.

Examples of the alkali include sodium hydroxide, potassium hydroxide, and lithium hydroxide. The amount of the alkali to be used is, for example, in the range from 2-fold to 5-fold by mole that of the bisphenol compound (mole equivalent in the range from 1 to 2.5).

As the catalyst, a phase-transfer catalyst preferably is used, and for example, a quaternary ammonium salt such as tetrabutylammonium bromide, trioctylmethylaminium chloride, or benzyltriethylaminium chloride, a quaternary phosphonium salt such as tetraphenylphosphonium chloride or triphenylmethylphosphonium chloride, or a polyethylene oxide compound such as polyethylene glycol, polyethylene glycol mono methyl ether, polyethylene glycol dimethyl ether, dibenzo-18-crown-6, or dicyclohexyl-18-crown-6 can be used. Among them, in terms of the ease of handling such as a removal after the reaction, any of tetraalkylammonium halides is used suitably. Further, other than them, an antioxidant, a molecular weight modifier, and the like can be used as required.

Examples of the method for adjusting the molecular weight of the polyarylate include a method in which a reaction is conducted with changing a functional group ratio between the hydroxyl group and the carboxyl group and a method in which a substance having a monofunctional group is added in a reaction. Examples of the molecular weight modifier include monovalent phenols such as phenol, cresol, and p-tert-butylphenol, monovalent acid chlorides such as benzoic acid chloride, methanesulfonyl chloride, and phenyl chloroformate, and monovalent alcohols such as methanol, ethanol, n-propanol, isopropanol, n-butanol, pentanol, hexanol, dodecyl alcohol, stearyl alcohol, benzyl alcohol, and phenethyl alcohol. A monovalent acid chloride may be allowed to react after the polycondensation reaction so that the terminal phenol can be sealed, whereby coloration of the phenol due to the oxidization thereof can be suppressed. An antioxidant may also be concomitantly used in the polycondensation reaction.

In the case of using the interfacial polycondensation method, the polycondensation reaction yields the state of mixture of an aqueous phase and an organic phase, which contains not only polyarylate, an organic solvent, and water but also a catalyst and impurities such as remaining monomers. In the case where the interfacial polycondensation method is conducted using the halogen solvent, as a method for removing soluble impurities, a method in which washing with water is conducted by repeatedly conducting a separation procedure of separating and removing an aqueous phase generally is used. Further, after the washing with water, re-deposition of polyarylate may be conducted using a water-miscible organic solvent that is a poor solvent to the polyarylate, such as acetone and methanol as required. By conducting the re-deposition, water and a solvent can be removed, it becomes possible to obtain the polyarylate as a powder, and further, hydrophobic impurities such as bisphenol compounds can be reduced. A solvent that has low solubility with water and cannot dissolve 0.5% by weight or more polyarylate preferably is used as the water-miscible organic solvent. In the viewpoint of capability of easily removing the solvent by heat-drying, the boiling point of the water-miscible organic solvent is preferably 120° C. or less. Preferred examples of such a water-miscible organic solvent include ketones such as cyclohexanone and isophorone and alcohols such as methanol, ethanol, propanol, and insopropyl alcohol, but they are variable because the solubility depends on the type of the polyarylate.

The concentration of the monomers to be added in the interfacial polycondensation reaction and the concentration of the polyarylate in the treatment after the reaction are preferably high so that productivity of polyarylate becomes high. The amount of the polyarylate with respect to the total liquid amount including the aqueous phase and the organic phase after the reaction is preferably 1% by weight or more, more preferably 3% by weight or more, and yet more preferably 5% by weight or more.

The reaction temperature is not particularly limited, and is, preferably in the range from −5° C. to 50° C. With the reaction temperature in the above-described range, the viscosity and the temperature can be easily adjusted during the reaction, and adverse reactions such as hydrolysis and coloration due to oxidization can be reduced. The reaction temperature is preferably in the range from 5° C. to 35° C., more preferably around room temperature in the range from 10° C. to 30° C.

In order to suppress the adverse reactions from occurring, the reaction temperature can be initially set low with consideration given to the heat generated in a polycondensation reaction. In order to allow the reaction to proceed gradually, alkali or dicarboxylic acid chloride can be gradually added. The addition of alkali or dicarboxylic acid chloride may be conducted in a short time period such as in less than 10 minutes, and is conducted preferably in 10 to 120 minutes, more preferably in 15 to 90 minutes in order to suppress a heat from generating. In order to suppress the coloration due to the oxidation from occurring, the reaction is preferably allowed to proceed under an inert gas atmosphere such as nitrogen.

The reaction time after the addition of alkali or dicarboxylic acid chloride is, for example, in the range from 10 minutes to 10 hours, preferably from 30 minutes to 5 hours, and more preferably from 1 to 4 hours, but it is variable depending on the type of the monomers, the amount of alkali to be used, the concentration of alkali, and the like.

After the interfacial polycondensation reaction is completed, the polyarylate thus obtained may be subjected to separation and wash with water and then used in the form of a resin solution or formed into powder with a poor solvent. In terms of environmental loads, the content of a halogen solvent in the polarylate is preferably 1000 ppm (0.1 wt %) or less, more preferably 300 ppm (0.03 wt %) or less, yet more preferably 100 ppm (0.01 wt %) or less, and particularly preferably 50 ppm (0.005 wt %) or less. Since the polyarylate is superior in solvent solubility and can be dissolved also in a solvent other than a halogen solvent, it is possible to reduce the content of a halogen solvent in the polyarylate using a solvent (for example, toluene, cyclohexan, or anisole) other than a halogen solvent in a polycondensation reaction.

It is preferred that the birefringence layer forming material may further contain a solvent that dissolves the non-liquid crystalline material. The solvent can be decided as appropriate depending on the type of the non-liquid crystalline material, and examples thereof include chloroform, dichloromethane, toluene, xylene, cyclohexanone, and cyclopentanone. These solvents may be used alone or in a combination of two or more of them.

Specifically, in terms of reducing environmental loads, as the solvent, a non-halogen solvent is preferably used, and any of aromatic hydrocarbons, ketones, and ethers can be used suitably. Among them, toluene, xylene, or cyclopentanone is preferably used, and toluene is the most preferably used. A mixed solvent containing the non-halogen solvent can also be used suitably. When the mixed solvent is used, the amount of the non-halogen solvent to be contained is preferably 50% by weight or more of the total, more preferably 80% by weight or more of the same. Among them, the amount of toluene to be contained is preferably 50% by weight or more of the total, more preferably 80% by weight or more of the same. In this case, as a solvent other than toluene, cyclopentanone, cyclohexanone, 4-methyl-2-pentanone (methyl isobutyl ketone, MIBK), N,N-dimethylacetamide (DMAc), dimethylformamide (DMF), dimethyl sulfoxide (DMSO) or the like can be used. In the case where the polyarylate is used as the non-liquid crystalline material, since the polyarylate is superior in solvent solubility, it can be dissolved in these low-polar solvents.

The method for producing the birefringence layer forming material is not particularly limited, and the known method may be used. For example, a method in which the non-liquid crystalline material formed into powder, pellet, or tablet is added gradually until the concentration thereof reaches the desired concentration while stirring the solvent can be used.

The concentration of the non-liquid crystalline material in the birefringence layer forming material is not particularly limited, and is, for example, preferably in the range from 1% to 30% by weight, more preferably from 1% to 20% by weight, in order to make the viscosity of the birefringence layer forming material suitable for applying. The "viscosity that is suitable for applying" means a viscosity that provides fluidity such that defects such as stripe-like unevenness of applying and the like are not produced in the applying. The viscosity is, for example, preferably 400 mPa·second or less, but it is variable depending on the type of the shrinkable film, the applying speed, the thickness of the applying, and the like. In the case where the thickness of the optical film is 20 μm or less, stripe-like defects tend to occur, and thus, the viscosity in the above-mentioned range is particularly preferred. The viscosity is more preferably 300 mPa·second or less. The viscosity is preferably 1 mPa·second or more because the thickness of the optical film can be easily adjusted to the desired thickness with the viscosity. Note here that the viscosity is a value measured at 25° C.

The birefringence layer forming material may further contain an additive as required. Examples of the additive include an antidegradant, an anti-ultraviolet agent, an anisotropy-adjusting agent, a plasticizer, an infrared-absorbing agent, and a filler. The additive may be solid or liquid. That is, the additive is not particularly limited by the melting point or the boiling point thereof.

An applied film is formed by applying the birefringence layer forming material directly on the shrinkable film. Examples of a method for applying the birefringence layer forming material include a spin coating method, a roller coating method, a flow coating method, a printing method, a dip coating method, a film flow-expanding method, a bar coating method, and a gravure printing method. Further, in the applying, multilayer coating can be employed.

Next, the applied film is shrunk through shrinking the shrinkable film. It is preferred that the applied film is dried prior to or at the same time as the shrinking. The drying may be natural drying, blow drying from blowing air, heat drying, or a combination method thereof. The drying condition can be decide as appropriate depending on the types of the shrinkable film, the non-liquid crystalline material, and the solvent and the concentration of the non-liquid crystalline material, and the like. The drying temperature is, for example, in the range from 25° C. to 300° C., preferably from 50° C. to 200° C., and more preferably from 60° C. to 180° C. The drying may be conducted at the constant temperature, or may be conducted while increasing or decreasing the temperature step by step. When the drying is conducted prior to the shrinking, it is preferred that the drying is conducted under the temperature condition under which the shrinkable film is not shrunk. The drying time also is not particularly limited, and is, for example, in the range from 10 seconds to 60 minutes, preferably from 30 seconds to 30 minutes.

Then, the shrinkable film is shrunk by conducting the heat treatment. By shrinking the applied film through shrinking the shrinkable film, a birefringence layer having a refractive index distribution that satisfies nx>nz>ny is formed. The condition of the heat treatment is not particularly limited, and may be decided as appropriate depending on the type of the shrinkable film and the like. The heating temperature is in the range from 25° C. to 300° C., preferably from 50° C. to 200° C., more preferably from 60° C. to 180° C. The shrinkage ratio of the applied film and the thickness of the birefringence layer are the same as mentioned above.

As mentioned above, in the present invention, the birefringence layer having a refractive index distribution that satisfies nx>nz>ny is formed by shrinking the applied film. At that time, the applied film may be shrunk through shrinking the shrinkable film, and a laminate of the shrinkage film and the applied film may be stretched in the direction that is orthogonal to the shrinking direction. The shrinking and the stretching may be conducted individually but are preferably conducted simultaneously. By conducting the shrinking and the stretching simultaneously, alignment properties generated by the shrinking and the stretching can be maintained without impairing. In this case, it is preferred that the stretching is performed in the width direction (the TD direction) of the shrinkable film, and the shrinking is performed in the longitudinal direction (the MD direction) of the shrinkable film. As a means of stretching the laminate, any suitable stretching machine such as a roll stretching machine, a tenter stretching machine, or a biaxial stretching machine may be used. The stretch ratio of the laminate is the same as mentioned above.

As above, the birefringence layer having a refractive index distribution that satisfies nx>nz>ny can be formed on the shrinkable film. The optical film of the present invention may be produced by a continuous production with conveying the shrinkable film or may be produced by a batch production. In the case where the optical film of the present invention is produced by the batch production, the shrinkable film that has been cut into the predetermined size is used. The laminate of the birefringence layer and the shrinkable film as it is may be used as the optical film of the present invention, or the single layer of the birefringence layer that has been removed from the shrinkable film may be used as the same. The optical film of the present invention may be produced by a transfer method in which the birefringence layer formed on the shrinkable film is attached to another base via a pressure-sensitive adhesive. The transfer method is performed after the formation of the birefringence layer. Thus, even though a contamination occurs in the transfer method, productivity of an optical film is not reduced like in the case where a contamination occurs at the time of attaching a resin film to a shrinkable film before the formation of a birefringence layer in a conventional producing method. The thickness of the optical film of the preset invention is preferably in the range from 1 to 20 μm, more preferably from 3 to 20 μm, and yet more preferably from 5 to 15 μm. The in-plane retardation of the birefringence layer in the optical film of the present invention is the same as mentioned above.

A cross-sectional view showing an example of a configuration of the optical film of the present invention is shown in FIG. 1. As shown in FIG. 1, this optical film 10 is configured so that a birefringence layer 12 is formed on a shrinkable film 11.

The optical film of the present invention is used in the laminated polarizing plate of the present invention. Thus, a bright point generated due to a contamination is not observed, and a light leakage due to an alignment failure also is not observed. Further, the optical film of the present invention can be thin film with the thickness of 20 μm or less, for example. Thus, the weight of the laminated polarizing plate of the present invention can be reduced. Furthermore, the laminated polarizing plate of the present invention is not warped, whereby it is superior in durability.

The image display of the present invention has the same configuration as the conventional image display except for using the laminated polarizing plate of the present invention. For example, a LCD can be produced by appropriately assembling respective components such as optical elements such as a liquid crystal cell and the like and optionally a lighting system (a backlight and the like), and building into a drive circuit. The laminated polarizing plate of the present invention is used in the image display of the present invention. Thus, it is possible to reduce display failures.

The image display of the present invention is applicable to any suitable use. Examples of the use thereof include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; exhibition devices such as information monitors for commercial stores; security devices such as surveillance monitors; and nursing care and medical devices such as nursing-care monitors and medical monitors.

EXAMPLES

Next, the examples of the present invention are described together with the comparative examples. Note here that the present invention is not limited by the following examples and comparative examples. The various characteristics in the following examples and comparative examples were evaluated or measured by the following method.

(Refractive Index of Birefringence Layer)

The refractive index of each of birefringence layers except for a birefringence layer of Example 4 was measured using "KOBRA-WPR" (product name), manufactured by Oji Scientific Instruments after removing the birefringence layers from the respective shrinkable films. In Example 4 in which the shrinkable film does not have retardation, the refractive index of the laminate of the shrinkable film and the birefringence layer was measured as the refractive index of the birefringence layer.

(Thickness of Birefringence Layer)

The thickness of each of birefringence layers was measured using a spectrophotometer for thin film, manufactured by Otsuka Electronics Co., Ltd. (product name: MCPD2000).

(Alignment Axis Accuracy of Optical Film)

The alignment axis accuracy of each of optical films was measured using "KOBRA21ADH" (product name), manufactured by Oji Scientific Instruments and evaluated according to the following evaluation criteria.

Evaluation Criteria

G: The alignment axis accuracy was in the range from −1.0° to +1.0°.

NG: The alignment axis accuracy was not in the range from −1.0° to +1.0°.

(Appearance of Optical Film)

Figure 2:
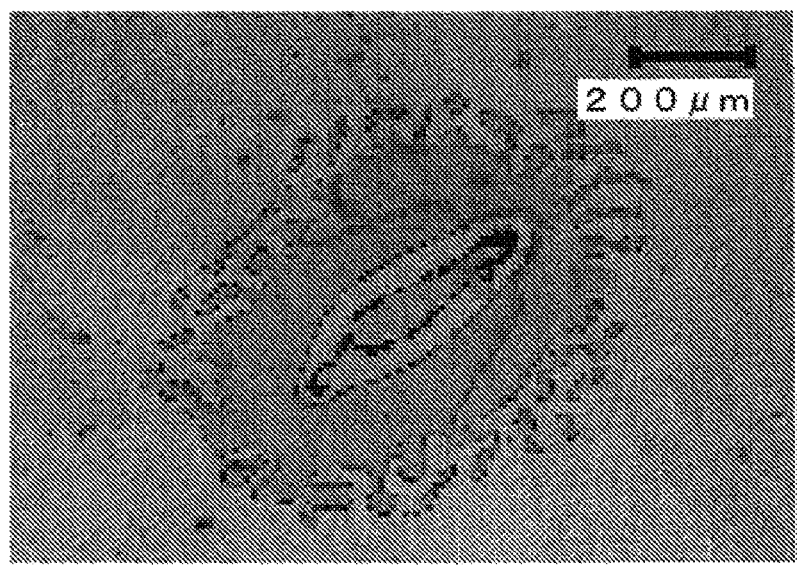
FIG. 2 is a photograph showing an optical film with a contamination.

The appearance of each of optical films was evaluated by visual check. When an obvious contamination was observed as shown in FIG. 2, it was evaluated that the optical film has a failure due to the contamination.

Evaluation Criteria

G: The contamination was reduced, and the appearance was favorable.

NG: The optical film has a failure due to the contamination.

(Bright Spot of Laminated Polarizing Plate)

Figure 3:
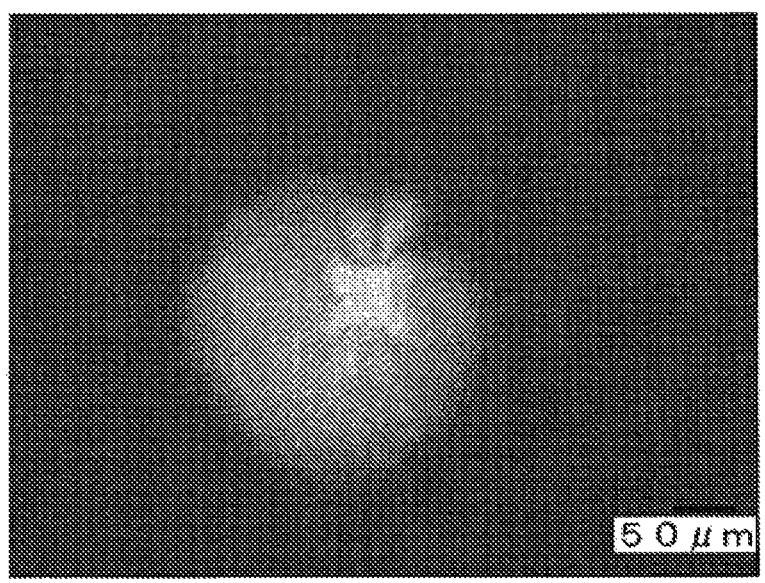
FIG. 3 is a photograph showing a laminated polarizing plate in which a bright point was observed.

The observation of bright points in each of laminated polarizing plates provided with optical films was conducted. The observation was conducted by inserting each of the optical films between a pair of polarizers arranged in a cross-nicol and using a differential interference microscope manufactured by Olympus Corporation. When bright point(s) was recognized as shown in FIG. 3, it was evaluated that there is a failure due to the bright point(s).

Evaluation Criteria

G: No bright point was observed, and the result was favorable.

NG: Bright point(s) was observed, and there was a failure due to the bright point(s).

Example 1

Synthesis of Non-Liquid Crystalline Material

In a reaction container provided with a stirrer, 2.70 g of 2,2-bis(4-hydroxy phenyl)-4-methylpentane and 0.06 g of benzyltriethylammonium chloride were dissolved in 25 mL of sodium hydroxide solution. To this solution thus obtained, a solution obtained by dissolving 2.03 g of terephthalic acid chloride in 30 mL of chloroform was added at a time while stirring, and they were stirred for 90 minutes at room temperature. Thus, a polycondensation solution was obtained. Thereafter, the polycondensation solution was subjected to static separation, so that a chloroform solution containing polyarylate was separated. Then, the solution thus separated was washed with an acetic acid aqueous solution and further with ion-exchange water, and the resultant solution was introduced into methanol, so that polyarylate was deposited. The polyarylate thus deposited was filtered and dried under reduced pressure. Thus, 3.41 g of white polyarylate (a yield of 92%) was obtained. The birefringence ($\Delta nxz$) of the polyarylate was 0.023.

(Production of Optical Film)

The polyarylate thus obtained (10 g) was dissolved in toluene (73 g), so that a birefringence layer forming material was prepared. Then, the birefringence layer forming material was applied directly on a shrinkable film (a biaxial-stretched film of PP, having 500×200 mm and the thickness of 60 μm) using an applicator, so that an applied film was formed. Thereafter, the applied film was dried for 5 minutes at 110° C. Thus, a laminate of the shrinkable film and the applied film was produced. The applied film was shrunk through shrinking the laminate 0.75-fold, while the laminate is stretched 1.2-fold in the direction that is orthogonal to the shrinking direction, at 155° C. using a batch-type simultaneous biaxial stretching machine. Thus, a birefringence layer was obtained. Then, the birefringence layer was removed from the shrinkable film. The birefringence layer had the thickness of 10.0 μm and satisfied nx=1.654, ny=1.626, and nz=1.640. Thus, an optical film of the present example was obtained.

Example 2

Synthesis of Non-Liquid Crystalline Material

Polyarylate was obtained in the same manner as the synthesis of Example 1.

(Production of Optical Film)

The polyarylate thus obtained (10 g) was dissolved in toluene (73 g), so that a birefringence layer forming material was prepared. Then, the birefringence layer forming material was applied directly on a shrinkable film (a biaxial-stretched film of PP, having 500×200 mm and the thickness of 60 μm) using an applicator, so that an applied film was formed. Thereafter, the applied film was dried for 5 minutes at 110° C. and shrunk 0.95-fold in one direction at 155° C. using a batch-type simultaneous biaxial stretching machine. Thus, a birefringence layer was formed. Then, the birefringence layer was removed from the shrinkable film. The birefringence layer had the thickness of 10.3 μm and satisfied nx=1.642, ny=1.639, and nz=1.640. Thus, an optical film of the present example was obtained.

Example 3

Synthesis of Non-Liquid Crystalline Material

Polyarylate was obtained in the same manner as the synthesis of Example 1.
(Production of Optical Film)
The polyarylate thus obtained (10 g) was dissolved in toluene (73 g), so that a birefringence layer forming material was prepared. Then, the birefringence layer forming material was applied directly on a shrinkable film (an uniaxial-stretched film of amorphous PET (APET), having 500×200 mm and the thickness of 143 μm) using an applicator, so that an applied film was formed. As the uniaxial-stretched film of APET, "NOVACLEAR" (product name), manufactured by Mitsubishi Plastics, Inc. was used. Thereafter, the applied film was dried for 5 minutes at 60° C. and shrunk 0.75-fold in one direction at 80° C. using a batch-type simultaneous biaxial stretching machine. Thus, a birefringence layer was formed. Then, the birefringence layer was removed from the shrinkable film. The birefringence layer had the thickness of 8.8 μm and satisfied nx=1.653, ny=1.628, and nz=1.639. Thus, an optical film of the present example was obtained.

Example 4

Synthesis of Non-Liquid Crystalline Material

Polyarylate was obtained in the same manner as the synthesis of Example 1.
(Production of Optical Film)
The polyarylate thus obtained (10 g) was dissolved in toluene (73 g), so that a birefringence layer forming material was prepared. Then, the birefringence layer forming material was applied directly on a shrinkable film (an uniaxial-stretched film of an acrylic resin, having 500×200 mm and the thickness of 93 μm) using an applicator, so that an applied film was formed. Thereafter, the applied film was dried for 5 minutes at 150° C. and shrunk 0.8-fold in one direction using a batch-type simultaneous biaxial stretching machine. Thus, a birefringence layer was formed. The birefringence layer had the thickness of 12.3 μm and satisfied nx=1.647, ny=1.633, and nz=1.640. Thus, an optical film of the present example was obtained.

Example 5

Provision of Non-Liquid Crystalline Material

As a non-liquid crystalline material, polyvinyl alcohol ("J40" (product name), manufactured by JAPAN VAM & POVAL CO., LTD.) was provided. The birefringence (Δnxz) of the polyvinyl alcohol was 0.0007.
(Production of Optical Film)
The polyvinyl alcohol (10 g) was dissolved in water (157 g), so that a birefringence layer forming material was prepared. Then, the birefringence layer forming material was applied directly on a shrinkable film (an uniaxial-stretched film of amorphous PET (APET), having 500×200 mm and the thickness of 143 μm) using an applicator, so that an applied film was formed. As the uniaxial-stretched film of APET, the same film as used in Example 3 was used. Thereafter, the applied film was dried for 5 minutes at 80° C. and shrunk 0.60-fold in one direction using a batch-type simultaneous biaxial stretching machine. Thus, a birefringence layer was formed. Then, the birefringence layer was removed from the shrinkable film. The birefringence layer had the thickness of 10.0 μm and satisfied nx=1.529, ny=1.514, and nz=1.517. Thus, an optical film of the present example was obtained.

Example 6

Synthesis of Non-Liquid Crystalline Material

In a reaction container provided with a stirrer, 2.14 g of 2,2-bis(4-hydroxy phenyl)-butane and 0.06 g of benzyltriethylammonium chloride were dissolved in 25 mL of 1 mol/L sodium hydroxide solution. To this solution thus obtained, a solution obtained by dissolving 1.02 g of terephthalic acid chloride and 1.02 g of isophthalic acid chloride in 30 mL of chloroform was added at a time while stirring, and they were stirred for 90 minutes at room temperature. Thus, a polycondensation solution was obtained. Thereafter, the polycondensation solution was subjected to static separation, so that a chloroform solution containing polyarylate was separated. Then, the solution thus separated was washed with an acetic acid aqueous solution and further with ion-exchange water, and the resultant solution was introduced into methanol, so that polyarylate was deposited. The polyarylate thus deposited was filtered and dried under reduced pressure. Thus, 3.31 g of white polyarylate (a yield of 90%) was obtained. The birefringence (Δnxz) of the polyarylate was 0.024.
(Production of Optical Film)
The polyarylate thus obtained (10 g) was dissolved in toluene (73 g), so that a birefringence layer forming material was prepared. Then, the birefringence layer forming material was applied directly on a shrinkable film (a biaxial-stretched film of PP, having 500×200 mm and the thickness of 60 μm) using an applicator, so that an applied film was formed. Thereafter, the applied film was dried for 5 minutes at 110° C. Thus, a laminate of the shrinkable film and the applied film was produced. The applied film was shrunk through shrinking the laminate 0.75-fold, while the laminate is stretched 1.2-fold in the direction that is orthogonal to the shrinking direction, at 155° C. using a batch-type simultaneous biaxial stretching machine. Thus, a birefringence layer was formed. Then, the birefringence layer was removed from the shrinkable film. The birefringence layer had the thickness of 7.30 μm and satisfied nx=1.676, ny=1.643, and nz=1.654. Thus, an optical film of the present example was obtained.

Example 7

Synthesis of Non-Liquid Crystalline Material

In a reaction container provided with a stirrer, 2.70 g of 2,2-bis(3,5-dimethyl-4-hydroxy phenyl)-butane and 0.06 g of benzyltriethylammonium chloride were dissolved in 25 mL of a 1 mol/L sodium hydroxide solution. To this solution thus obtained, a solution obtained by dissolving 2.03 g of terephthalic acid chloride in 30 mL of chloroform was added at a time while stirring, and they were stirred for 90 minutes at room temperature. Thus, a polycondensation solution was obtained. Thereafter, the polycondensation solution was subjected to static separation, so that a chloroform solution containing polyarylate was separated. Then, a liquid thus separated was washed with an acetic acid aqueous solution and further with ion-exchange water, and the resultant solution was introduced into methanol, so that polyarylate was deposited. The polyarylate thus deposited was filtered and dried under reduced pressure. Thus, 3.51 g of white polyarylate (a yield of 92%) was obtained. The birefringence ($\Delta nxz$) of the polyarylate was 0.026.

(Production of Optical Film)

The polyarylate thus obtained (10 g) was dissolved in toluene (73 g), so that a birefringence layer forming material was prepared. Then, the birefringence layer forming material was applied directly on a shrinkable film (a biaxial-stretched film of PP, having 500×200 mm and the thickness of 60 μm) using an applicator, so that an applied film was formed. Thereafter, the applied film was dried for 5 minutes at 110° C. Thus, a laminate of the shrinkable film and the applied film was produced. The applied film was shrunk through shrinking the laminate 0.75-fold, while the laminate is stretched 1.2-fold in the direction that is orthogonal to the shrinking direction, at 155° C. using a batch-type simultaneous biaxial stretching machine. Thus, a birefringence layer was formed. Then, the birefringence layer was removed from the shrinkable film. The birefringence layer had the thickness of 7.32 μm and satisfied nx=1.593, ny=1.566, and nz=1.575. Thus, an optical film of the present example was obtained.

Example 8

Synthesis of Non-Liquid Crystalline Material

In a reaction container provided with a stirrer, 2.98 g of 2,2-bis(3-methyl-4-hydroxy phenyl)-4-methylpentane and 0.06 g of benzyltriethylammonium chloride was dissolved in 25 mL of a 1 mol/L sodium hydroxide solution. To this solution thus obtained, a solution obtained by dissolving 2.03 g of terephthalic acid chloride in 30 mL of chloroform was added at a time while stirring, and they were stirred for 90 minutes at room temperature. Thus, a polycondensation solution was obtained. Thereafter, the polycondensation solution was subjected to static separation, so that a chloroform solution containing polyarylate was separated. Then, the solution thus separated was washed with an acetic acid aqueous solution and further with ion-exchange water, and the resultant solution was introduced into methanol, so that polyarylate was deposited. The polyarylate thus deposited was filtered and dried under reduced pressure. Thus, 3.41 g of white polyarylate (a yield of 91%) was obtained. The birefringence ($\Delta nxz$) of the polyarylate was 0.023.

(Production of Optical Film)

The polyarylate thus obtained (10 g) was dissolved in toluene (73 g), so that a birefringence layer forming material was prepared. Then, the birefringence layer forming material was applied directly on a shrinkable film (a biaxial-stretched film of PP, having 500×200 mm and the thickness of 60 μm) using an applicator, so that an applied film was formed. Thereafter, the applied film was dried for 5 minutes at 110° C. Thus, a laminate of the shrinkable film and the applied film was produced. The applied film was shrunk through shrinking the laminate 0.75-fold, while the laminate is stretched 1.2-fold in the direction that is orthogonal to the shrinking direction, at 155° C. using a batch-type simultaneous biaxial stretching machine. Thus, a birefringence layer was formed. Then, the birefringence layer was removed from the shrinkable film. The birefringence layer had the thickness of 8.12 μm and satisfied nx=1.607, ny=1.579, and nz=1.587. Thus, an optical film of the present example was obtained.

Comparative Example 1

To each of the surfaces of a polycarbonate film (having 200×100 mm and the thickness of 65 μm and satisfying the birefringence ($\Delta nxz$)=0.00029), a shrinkable film (biaxial-stretched PP, having the thickness of 60 μm) with the same size as the polycarbonate film was attached using an acrylic pressure-sensitive adhesive. Thus, a laminate was obtained. Thereafter, the polycarbonate film was shrunk through shrinking the laminate 0.90-fold, while the laminate is stretched 1.4-fold in the direction that is orthogonal to the shrinking direction, at 150° C. using a batch-type simultaneous biaxial stretching machine. Thus, a birefringence layer was obtained. Then, the birefringence layer was removed from the shrinkable films. The birefringence layer had the thickness of 60.1 μm and satisfied nx=1.589, ny=1.581, and nz=1.585. Thus, an optical film of the present comparative example was obtained.

Comparative Example 2

To each of the surfaces of a norbornene resin film (having 200×100 mm and the thickness of 130 μm and satisfying the birefringence ($\Delta nxz$)=0.00018), a shrinkable film (biaxial-stretched PP, having the thickness of 60 μm) with the same size as the norbornene resin film was attached using an acrylic pressure-sensitive adhesive. Thus, a laminate was obtained. Thereafter, the norbornene resin film was shrunk through shrinking the laminate 0.80-fold, while the laminate is stretched 1.5-fold in the direction that is orthogonal to the shrinking direction, at 150° C. using a batch-type simultaneous biaxial stretching machine. Thus, a birefringence layer was obtained. Then, the birefringence layer was removed from the shrinkable films. The birefringence layer had the thickness of 131.4 μm and satisfied nx=1.521, ny=1.519, and nz=1.520. Thus, an optical film of the present comparative example was obtained.

The optical films of the respective examples and comparative examples were subjected to measurements or evaluations of the various characteristics. The results are shown in Table 1 below.

TABLE 1

| | Shrinkable film | Birefringence layer forming material | Forming method | Stretch ratio | Shrinkage ratio | nx | ny | nz | Front retardation (nm) | Thickness (μm) | Axis accuracy | Appearance | Bright point |
|---|---|---|---|---|---|---|---|---|---|---|---|---|---|
| Ex. 1 | Biaxial-stretched PP | Polyarylate | Applying | 1.2 | 0.75 | 1.654 | 1.626 | 1.640 | 280 | 10.0 | G | G | G |
| Ex. 2 | Biaxial-stretched PP | Polyarylate | Applying | 1.0 | 0.95 | 1.642 | 1.639 | 1.610 | 30.9 | 10.3 | G | G | G |
| Ex. 3 | Uniaxial-stretched APET | Polyarylate | Applying | 1.0 | 0.75 | 1.653 | 1.628 | 1.639 | 220 | 8.8 | G | G | G |
| Ex. 4 | Uniaxial-stretched acrylic resin | Polyarylate | Applying | 1.0 | 0.80 | 1.647 | 1.633 | 1.640 | 172.2 | 1.2.3 | G | G | G |
| Ex. 5 | Uniaxial-stretched APET | Polyvinyl alcohol | Applying | 1.0 | 0.60 | 1.529 | 1.514 | 1.517 | 150 | 10.0 | G | G | G |
| Ex. 6 | Biaxial-stretched PP | Polyarylate | Applying | 1.2 | 0.75 | 1.676 | 1.643 | 1.654 | 242.7 | 7.30 | G | G | G |
| Ex. 7 | Biaxial-stretched PP | Polyarylate | Applying | 1.2 | 0.75 | 1.593 | 1.566 | 1.575 | 199.4 | 7.32 | G | G | G |

TABLE 1-continued

| | Shrinkable film | Birefringence layer forming material | Forming method | Stretch ratio | Shrink- age ratio | nx | ny | nz | Front retardation (nm) | Thick- ness (μm) | Axis accu- racy | Ap- pear- ance | Bright point |
|---|---|---|---|---|---|---|---|---|---|---|---|---|---|
| Ex. 8 | Biaxial-stretched PP | Polyarylate | Applying | 1.2 | 0.75 | 1.607 | 1.579 | 1.587 | 226 | 8.12 | G | G | G |
| Comp. Ex. 1 | Biaxial-stretched PP | Polycarbonate | Attaching | 1.4 | 0.90 | 1.589 | 1.581 | 1.585 | 480.8 | 60.1 | NG | NG | NG |
| Comp. Ex. 2 | Biaxial-stretched PP | Norbornene resin | Attaching | 1.5 | 0.80 | 1.521 | 1.519 | 1.520 | 262.8 | 131.4 | NG | NG | NG |

As shown in Table 1, in the examples, the birefringence layers were thin layers each with the thickness of 20 μm or less, and favorable results were obtained in alignment axis accuracy, appearance, and bright point. In contrast, in the comparative examples, the thickness of each of the birefringence layers was significantly in excess of 20 μm, and there were failures in alignment axis accuracy, appearance, and bright point.

As mentioned above, in each of the laminated polarizing plates provided with the respective optical films obtained in the examples, a bright point generated due to a contamination was not observed, and a light leakage due to an alignment failure was not observed. Further, by providing an image display with each of the laminated polarizing plates, it became possible to provide an image display with no display failures.

INDUSTRIAL APPLICABILITY

According to the optical film producing method of the present invention, it is possible to produce an optical film including a birefringence layer having a refractive index distribution that satisfies nx>nz>ny, in which there are a few steps, and a contamination is reduced. Thus, the optical film of the present invention can be, for example, used in an image display such as LCD suitably, the use thereof is not limited, and it is applicable to the wide range of field.

The invention claimed is:

1. A method for producing an optical film, the method comprising:

forming an applied film by applying a solution containing a non-liquid crystalline material with a birefringence ($\Delta nxz$) in a thickness direction thereof, represented by the following formula, of 0.0007 or more directly on a shrinkable film; and then solidifying the solution to form the applied film; and wherein the non-liquid crystalline material is at least one material selected from the group consisting of polyarylate, polyvinyl alcohol, polyfumaric acid ester, polyether sulfone, and polysulfone, and forming a birefringence layer having a refractive index distribution that satisfies nx>nz>ny by shrinking the applied film through shrinking the shrinkable film, wherein $\Delta nxz = nx' - nz'$ nx': in a case where the non-liquid crystalline material is solidified so as to be a solidified layer, a refractive index in a direction (a slow axis direction) in which an in-plane refractive index of the solidified layer reaches its maximum, nz': a refractive index in a thickness direction of the solidified layer that is orthogonal to each of an nx' direction and a direction (a fast axis direction) that is orthogonal to the nx' direction within a plane of the solidified layer, nx: a refractive index in a direction (a slow axis direction) in which an in-plane refractive index of the birefringence layer reaches its maximum, ny: a refractive index in a direction (a fast axis direction) that is orthogonal to an nx direction within a plane of the birefringence layer, and nz: a refractive index in a thickness direction of the birefringence layer that is orthogonal to each of the nx direction and an ny direction.

2. The method according to claim 1, wherein the non-liquid crystalline material comprises polyarylate.

3. The method according to claim 2, wherein the polyarylate includes repeating units represented by the following general formula (I),

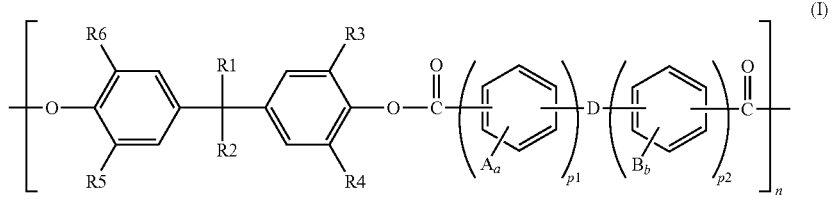

where in the formula (I),

A and B each represents a substituent, are each a halogen atom, an alkyl group with a number of carbon atoms from 1 to 6, or a substituted or unsubstituted aryl group, and are identical to or different from each other, a and b represent the numbers of substituents of A and B, respectively, and are each an integer from 1 to 4, D is a covalent bond, a $CH_2$ group, a $C(CH_3)_2$ group, a $C(CZ_3)_2$ group (where Zs are halogen atoms), a CO group, an O atom, a S atom, a $SO_2$ group, a $Si(CH_2CH_3)_2$ group, or a $N(CH_3)$ group, R1 is a straight chain or branched alkyl group with a number of carbon atoms from 1 to 10 or a substituted or unsubstituted aryl group, R2 is a straight chain or branched alkyl group with a number of carbon atoms from 2 to 10 or a substituted or unsubstituted aryl group, R3, R4, R5, and R6 are each a hydrogen atom or a straight chain or branched alkyl group with a number of carbon atoms from 1 to 4, are identical to or different from each other, and are not all hydrogen atoms, p1 is an integer from 0 to 3, p2 is an integer from 1 to 3, and n is an integer of 2 or more.

4. The method according to claim 1, wherein in the forming of the birefringence layer, a shrinkage ratio of the applied film is in a range from 0.50 to 0.99.

5. The method according to claim 1, wherein in the forming of the birefringence layer, the applied film is shrunk through shrinking the shrinkable film, and a laminate of the shrinkable film and the applied film is stretched in a direction that is orthogonal to a shrinking direction.

6. The method according to claim 5, wherein a stretch ratio of the laminate is in a range from 1.01 to 3.0.

7. The method according to claim 1, wherein the shrinkable film is a stretchable film formed of at least one forming material selected from the group consisting of polyolefin, polyester, an acrylic resin, polyamide, polycarbonate, a norbornene resin, polystyrene, polyvinyl chloride, polyvinylidene chloride, a cellulose resin, polyether sulfone, polysulfone, polyimide, polyacryl, an acetate resin, polyarylate, polyvinyl alcohol, and a liquid crystal polymer.

8. The method according to claim 1, wherein in the forming of the birefringence layer, the shrinkable film is shrunk by heating the shrinkable film.

9. The method according to claim 1, wherein a thickness of the birefringence layer is 20 μm or less.

* * * * *